United States Patent
Wieland et al.

(10) Patent No.: US 10,731,848 B2
(45) Date of Patent: Aug. 4, 2020

(54) ASSEMBLY HAVING A NUMBER OF HEAT EXCHANGERS, AND METHOD FOR EVAPORATING A WORKING MEDIUM

(71) Applicant: Maschinenwerk Misselhorn MWM GmbH, Munich (DE)

(72) Inventors: Christoph Wieland, Munich (DE); Moritz Gleinser, Munich (DE); Hartmut Spliethoff, Olching (DE); Manfred Moullion, Munich (DE)

(73) Assignee: Maschinenwerk Misselhorn MWM GMBH, Munich (DE)

( * ) Notice: Subject to any disclaimer, the term of this patent is extended or adjusted under 35 U.S.C. 154(b) by 471 days.

(21) Appl. No.: 15/309,729

(22) PCT Filed: May 8, 2015

(86) PCT No.: PCT/EP2015/060262
§ 371 (c)(1),
(2) Date: Jul. 14, 2017

(87) PCT Pub. No.: WO2015/169965
PCT Pub. Date: Nov. 12, 2015

(65) Prior Publication Data
US 2017/0336067 A1    Nov. 23, 2017

(30) Foreign Application Priority Data
May 9, 2014   (DE) .................. 10 2014 006 909

(51) Int. Cl.
*F22B 35/00* (2006.01)
*F22B 9/00* (2006.01)
(Continued)

(52) U.S. Cl.
CPC ............ *F22B 35/007* (2013.01); *F01K 25/02* (2013.01); *F01K 25/08* (2013.01); *F22B 9/00* (2013.01); *F28F 27/02* (2013.01); *Y02P 80/152* (2015.11)

(58) Field of Classification Search
CPC .......... F22B 35/007; F01K 25/02; F28F 27/02
(Continued)

(56) References Cited

U.S. PATENT DOCUMENTS 8,302,399 B1 *  11/2012  Freund .................... F01N 5/02
                                                        60/605.1
2003/0136130 A1    7/2003  Sugishita
(Continued)

OTHER PUBLICATIONS

International Search Report dated Aug. 12, 2015 for International Application No. PCT/EP2015/060262 (4 pages).

*Primary Examiner* — Paul Alvare
(74) *Attorney, Agent, or Firm* — Tarolli, Sundheim, Covell & Tummino LLP; John A. Yirga, Esq.

(57) ABSTRACT

An arrangement having multiple heat exchangers and a method for evaporating a working fluid by transferring heat from a heat source medium is described herein. The arrangement is used in connection with a system for recovering energy from waste heat in a thermodynamic cycle, in which the waste heat is used as the heat source medium. Each heat exchanger has a heat source medium through-passage separated from a working fluid chamber are serially interconnected in a ring arrangement. A supply line is provided between the heat source medium through-passages of any two serially consecutive heat exchangers in the ring arrangement, which can be connected selectively to the inlet of the heat source medium through-passage of each heat exchanger. Further, a discharge line for the heat source medium is provided, which can be connected selectively to
(Continued)

Figure 1:
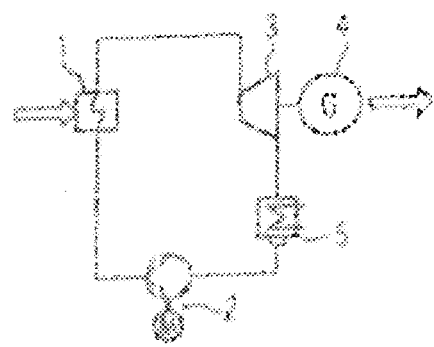

the outlet of the heat source medium through-passage of each heat exchanger.

20 Claims, 5 Drawing Sheets

(51) Int. Cl.
*F01K 25/02* (2006.01)
*F01K 25/08* (2006.01)
*F28F 27/02* (2006.01)

(58) Field of Classification Search
USPC ............... 165/100, 101; 62/79, 238.1, 238.4
See application file for complete search history.

(56) References Cited

U.S. PATENT DOCUMENTS

| | | | |
|---|---|---|---|
| 2009/0000294 A1* | 1/2009 | Misselhorn | F02G 1/0435 60/517 |
| 2011/0005477 A1* | 1/2011 | Terashima | F01K 23/065 123/41.51 |
| 2011/0139402 A1* | 6/2011 | Kylefors | F01P 3/20 165/101 |
| 2012/0111003 A1* | 5/2012 | Kasuya | F01K 13/02 60/618 |
| 2014/0075962 A1 | 3/2014 | Freese et al. | |
| 2016/0024974 A1* | 1/2016 | Weng | F01K 25/08 60/651 |
| 2017/0219293 A1* | 8/2017 | Kreuger | F28D 15/00 |

* cited by examiner

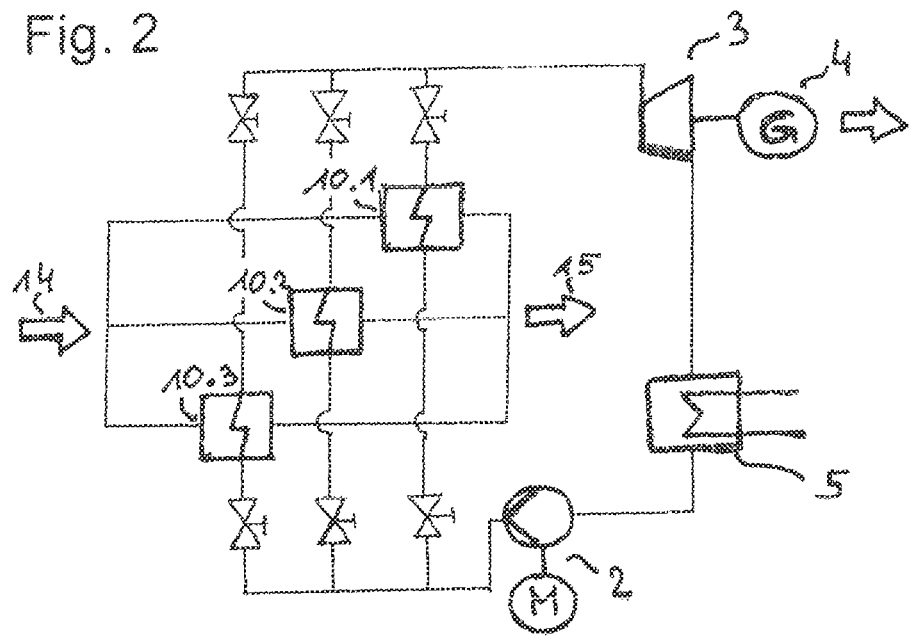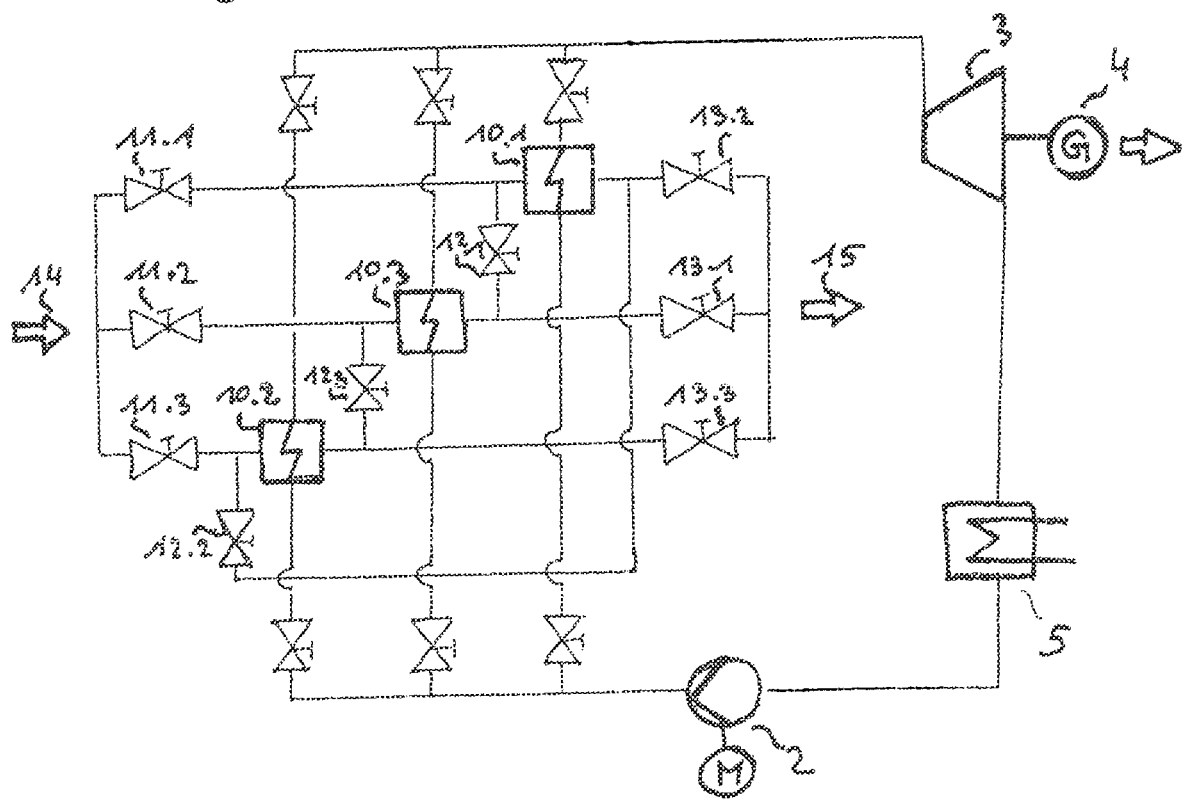

Fig. 6
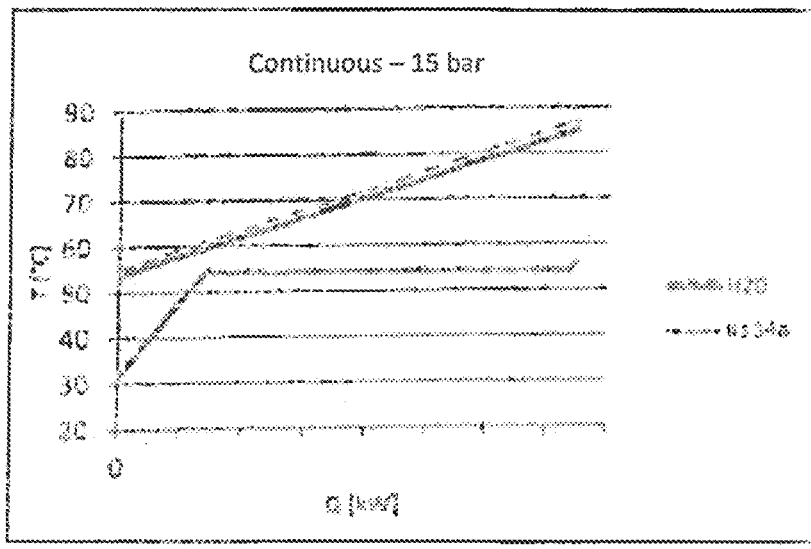
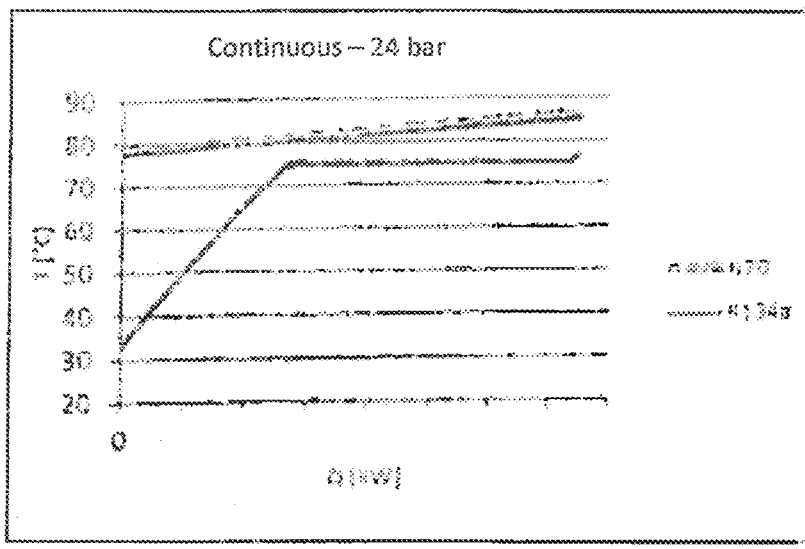

ASSEMBLY HAVING A NUMBER OF HEAT EXCHANGERS, AND METHOD FOR EVAPORATING A WORKING MEDIUM

CROSS-REFERENCES TO RELATED APPLICATIONS

The present application is a 35 U.S.C. § 371 National Stage Patent Application of International PCT Application Serial No. PCT/EP2015/060262 having an International filing date of 8 May 2015 and that was published on 12 Nov. 2015 under international publication number WO 2015/169965, which claims priority to German Patent Application No. 102014006909.5 filed 9 May 2014. This Application claims priority to and incorporates by reference the above-identified applications in their entirety for all purposes.

The invention relates to an arrangement with multiple heat exchangers for evaporating a working fluid by the transferring heat of a heat source medium as well as a method for evaporating a working fluid by the transferring heat of a heat source medium in such an arrangement. This arrangement and the method can be used in a particularly advantageous manner in connection with a system and a method for recovering energy from heat in a thermodynamic cycle process, in which the waste heat is used as the heat source medium.

Thermodynamic cycles for converting externally supplied heat energy into mechanical work are known for example in the form of the classic steam engine cycle, the Stirling cycle, the Clausius-Rankine cycle and the organic Rankine cycle (or ORC process). In the ORC process and in contrast to a classic steam engine cycle, one uses instead of water an organic, low boiling point-material as the working fluid, which continually circulates between a heat exchanger used as an evaporator, in which the initially liquid working fluid is evaporated by means of the externally supplied heat, a turbine, in which the vaporous working fluid is expanded under the extraction of mechanical work, and a condenser, in which the working fluid is cooled back down and made liquid again. With the ORC process, one is attempting through the selection of a suitable working fluid and through the optimization of the pressure and temperature to process parameters also cost-effectively transform small sources of thermal energy into mechanical work or electric energy. However, to cost-effectively operate an ORC process, a temperature level of more than 100° Celsius is required, because the efficiency drops substantially at lower process temperatures and given a small temperature spread between the heat source and the heat sink, the efficiency drops substantially.

The use of heat sources with a temperature level below 100° Celsius is relatively uneconomical, but increasingly of environmental interest and, because of the higher prices of primary energy in the form of fossil fuels, also of economic interest. Such heat or waste heat sources with relatively low temperature levels are represented for example by geothermal energy, thermal solar systems, the cooling circuits of stationary and mobile large-scale combustion engines or turbines, the waste heat of power generation in all forms (e.g., in combined heat and power plants or CHP plants), industrial process heat, or waste heat from biogas facilities. To date, waste heat remains largely unused if it cannot be utilized on site for space heating or process water heating, and it is released into the environment because transporting the heat over considerable distances or storage or conversion and other use in the form of electrical or mechanical energy at this temperature level has not been economically possible to date.

FIG. 1 depicts for example purposes a conventional ORC system with direct evaporation. A heat exchanger 1, which functions as a heat transfer device or evaporator, is supplied with heat from a heat source (indicated by the arrow). Heat from a liquid working fluid is supplied by a feed pump 2 into evaporator 1 and the working fluid is thereby evaporated. The vaporous working fluid is supplied via a pressure line to a work engine (for example, a turbine or a piston engine). The vaporous working fluid is expanded in the work engine, and work engine 3 drives a generator 4 to generate electrical energy (indicated by the arrow). The decompressed vaporous working fluid is condensed in a condenser 5 and the liquefied working fluid is supplied back to evaporator 1 via the feed pump.

A variation to the ORC process is known from DE 102013009351 B3, which is referred to hereafter as the "Misselhorn" process and which serves as a basis for a system and a method to recover energy from heat in a thermodynamic cycle, with which the use of heat sources is possible with appropriate efficiency and under economic conditions, which have a temperature level of less than 100° Celsius. With this system, the cycle process has the following intercommunicating connected components: a condenser for recooling and liquefying a working fluid, an evaporation arrangement provided downstream—in relation to the flow direction of the working fluid—from the condenser for supplying the heat energy to the working fluid to raise its temperature and pressure, wherein the evaporator or heat exchanger arrangement has at least two heat transmission units operating independently from each other as evaporators, a work chamber, provided downstream from the heat exchanger arrangement, of a work engine for decompressing the working fluid from the heat exchanger arrangement, to draw energy out of the working fluid, and a return for the at least partially decompressed working fluid to the condenser. A pump for the working fluid is arranged between the condenser and the heat exchanger arrangement. Upstream and downstream from the heat transmission units, a valve arrangement is provided, which can be actuated in such a manner that working fluid can flow selectively into the heat transmission unit for each heat transmission unit in a first phase, the heat transmission unit is completely separated from the cycle process in a second phase to heat the collected working fluid and raise its pressure, and in a third phase the heated or evaporated working fluid can flow out to the work chamber. The valve arrangement controls the connection/separation of the heat transmission units with/of the cycle process in such a manner that the heat transmission units pass through these phases sequentially and in a time-delayed manner respectively. However, the heat source medium passes through the heat source medium through-passages of the individual heat transmission units in a parallel and continual manner. A diagram of this heat exchanger arrangement and the integration into the "Misselhorn" process is depicted in FIG. 2.

With the system or the method according to the "Misselhorn" process, one is able to have an almost continual supply of pressurized non-continuously heated working fluid under pressure or of evaporated working fluid to the work chamber of the work engine is possible, where it is decompressed through the conversion into mechanical energy. Because the working fluid is heated and pressure-boosted or evaporated in multiple fractions separated from each other and time-offset in separate heat transmission units, heat sources with a relatively low temperature level can also be used effectively. By means of the heating and evaporation, which are time-offset and separated into fractions, of the individual fractions of the working fluid, there is in each case a longer time span available to evaporate the working fluid.

DE 102010033124 A1 describes a combustion engine with a heat recovery device having a feed unit, at least two heat exchangers arranged in parallel in a working fluid cycle and having the capacity to have a working fluid flow through them, an expansion device, and a condenser. Between the feed unit and the heat exchanger in the working fluid cycle, a distribution apparatus is arranged in such a manner that the working fluid flow can be divided into working fluid sub-flows and the working fluid sub-flow flowing through the respective heat exchanger can be controlled and/or regulated to adapt to the operating conditions of the combustion engine. The heat exchangers are arranged one after the other in the exhaust gas stream serving as the heat source medium and are subjected sequentially to the lost heat of the exhaust gas stream.

DE 10200706259 A1 describes a similar arrangement of multiple heat exchangers arranged parallel relative to the working fluid sub-flow in a combustion engine, wherein no controllable distribution device is provided but a separate pump is assigned to each heat transfer device.

EP 2522828 A2 describes an ORC cycle, in which multiple transfer devices arranged parallel relative to the working fluid sub-flow have a charge air flow serving as a heat source medium flow sequentially through them to use its heat to preheat the working fluid in the cycle process.

CA 2744404 A1 describes an ORC cycle process in which to increase the absorbable heat quantity from the ground or the ambient air, a plurality of evaporators are arranged in a matrix parallel and in series relative to the working fluid sub-flow, and all evaporators have the heat source medium flow through them in a parallel and simultaneous manner.

With the invention, the process of evaporating the working fluid, particularly for use in a system and a method for recovering energy from heat in a thermodynamic cycle, preferably but not exclusively the "Misselhorn" process, is to be further improved so that the utilization of energy from the respective heat source can occur with greater efficiency, and [a] vaporous working fluid can be provided at high pressure as constantly as possible, and in particular so that the pinch point limitation of conventional ORC systems can be avoided.

For solution purposes, the invention proposes an arrangement with multiple heat exchangers for evaporating a working fluid by transferring heat from a heat source medium and a method for evaporating a working fluid by transferring heat from a heat source medium in an arrangement with multiple heat exchangers. Preferred embodiments of the arrangement and the method are provided in the dependent claims.

Accordingly, the invention relates to an arrangement with multiple heat exchangers for evaporating a working fluid by transferring heat from a heat source medium, wherein each heat exchanger has a heat source medium through-passage and separated from that a working fluid chamber, and the heat source medium through-passages of the heat exchangers are or can be serially interconnected, preferably in a ring arrangement, wherein between the heat source medium through-passages of any two serially consecutive heat exchangers in the ring arrangement, one valve means is provided in each case, wherein a supply line is provided for the heat source medium, which can be connected selectively to the inlet of the heat source medium through-passage of each heat exchanger, and wherein a discharge line is provided for the heat source medium, which can be connected selectively to the outlet of the heat source medium through-passage of each heat exchanger.

Accordingly, the invention also relates to a method for evaporating a working fluid by transferring heat from a heat source medium in an arrangement with multiple heat exchangers, which each have a heat source medium through-passage and separated from that a working fluid chamber, and their heat source medium through-passages are or can be interconnected in series, preferably in a ring arrangement, with the steps of a sequential connecting of a supply line for the heat source medium to the inlet of the heat source medium through-passage of a first heat exchanger and a sequential connecting of a discharge line for the heat source medium to the outlet of the heat source medium through-passage of a second heat exchanger, while the supply line and discharge line are separated from the inlet of the heat source medium through-passage of the second or of the outlet of the heat source medium through-passage of the first heat exchanger and, if present, is separated from the inlets and outlets of the heat source medium through-passages of additional heat exchangers of the arrangement.

The arrangement according to the invention or the method according to the invention allows a more efficient utilization of the heat energy of the respective heat source, by the heat source medium of the heat source being introduced directly into the heat exchanger for example, and the heat source medium being directed, after passing through a first heat exchanger and a partial extraction of the heat energy, serially through the other heat exchangers of the arrangement. The sequence of the heat source medium passing through the heat exchangers can be cyclically switched over so that in every cycle the liquid working fluid is introduced into another heat exchanger (which in this phase has the lowest temperature and/or pressure level of the working fluid) or the heated and evaporated working fluid is discharged out of another heat exchanger (which in this phase has the highest temperature and/or pressure level of the working fluid).

Figure 7:
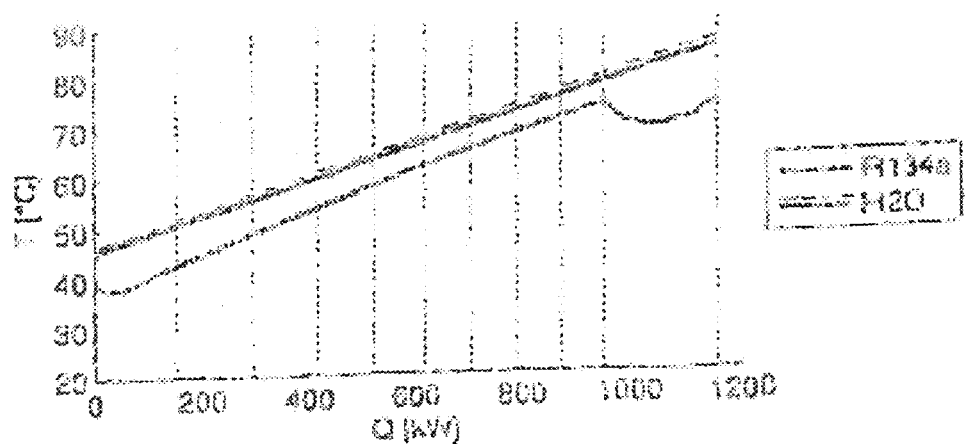

With the arrangement according to the invention, the pinch-point limitation of conventional ORC systems is avoided. By means of the in-series arrangement, preferably in a ring arrangement, of multiple heat exchangers operating as evaporators in batch mode, and the routing of the hot heat source medium from evaporators having a higher temperature of the working fluid to evaporators with a lower temperature of the working fluid, the respective necessary pinch-point is maintained in each evaporator. Since only the evaporator with the highest temperature of the heat source medium is connected to the work or expansion engine, the result is always a high pressure of the working fluid when flowing out to the expansion engine and thus good thermal efficiency of the system. In the evaporators connected just downstream from the work engine, the heat source is further cooled by transferring heat to the working fluid in the respective evaporator and the system efficiency increases (see FIG. 7, which depicts the T-Q diagram for a heat exchanger arrangement with 10 heat exchangers operating as evaporators).

"Pinch point" refers to the temperature difference between the heat-emitting (the relatively hot) and the heat-absorbing (the relatively cool) mass flow at the point that describes the closest proximity of the TQ curves of heat source medium and working fluid. Only when there is a temperature difference between the hot and the cold medium, which should generally be at least 5K to 10K, a heat transfer occurs in finite time and with economically feasible heat transfer surfaces. In principle, the ORC process can be run in 2 different modes (and intermediate stages thereof):

a) Good utilization of the heat source, i.e., largest possible temperature decrease of the hot heat source medium, i.e., optimized system efficiency. System efficiency is a measure of how much total heat available is converted into work (see FIG. 6, top), or b) Good utilization of the transferred heat outlet, i.e., high thermal efficiency, however then with poorer utilization of the heat source and correspondingly lower system efficiently. The thermal efficiency describes how efficient the actually transferred heat is converted into work (see FIG. 6, bottom).

Often, a compromise is desired, depending on the utilization possibilities of the residual heat after the ORC and/or other factors. In order to achieve the highest possible outlet of the ORC system, the pressure level of the working fluid, which leaves the evaporator and flows into the work or expansion engine, e.g., a turbine or a piston engine, must be as high as possible. Due to thermodynamics, a high pressure requires a high temperature of the working fluid. This high temperature plus the temperature difference due to the pinch point generates the minimum required temperature of the hot heat source medium in the evaporator. The higher the desire pressure and temperature levels of the working fluid, the less the heat source can thus be cooled. To achieve the highest possible system efficiency, the heat source is cooled to a greater degree, the maximum temperature of the working fluid lies below the low, cooled temperature of the heat source medium by the pinch point interval. The high temperatures of the heat source medium remain unused, i.e., only a relatively low pressure of the working fluid and thus a low outlet of the expansion engine can be achieved.

The combination of the arrangement according to the invention of heat exchangers to evaporate a working fluid through the exchange of heat with a heat source medium ca thus be combined in a particularly advantageous manner in connection with the system, known from DE 102013009351, to recover energy from heat in a thermodynamic cycle process because this system on the cyclic connection always provides of a heat exchanger with multiple heat exchangers with the work chamber of a work engine, which has the highest temperature level or the working fluid with the highest temperature and/or pressure level, while the or another heat exchanger is supplied with a liquid working fluid and heated, and additional heat exchangers including the working fluid are heated.

Figure 4A:
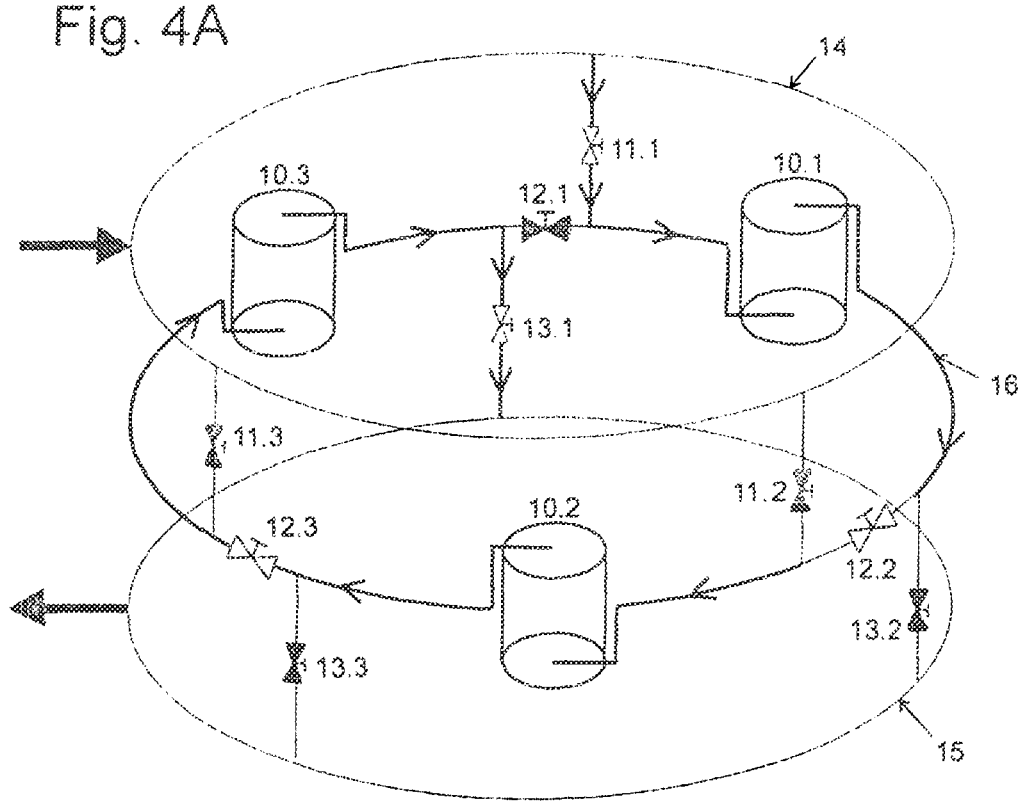
Figure 4B:
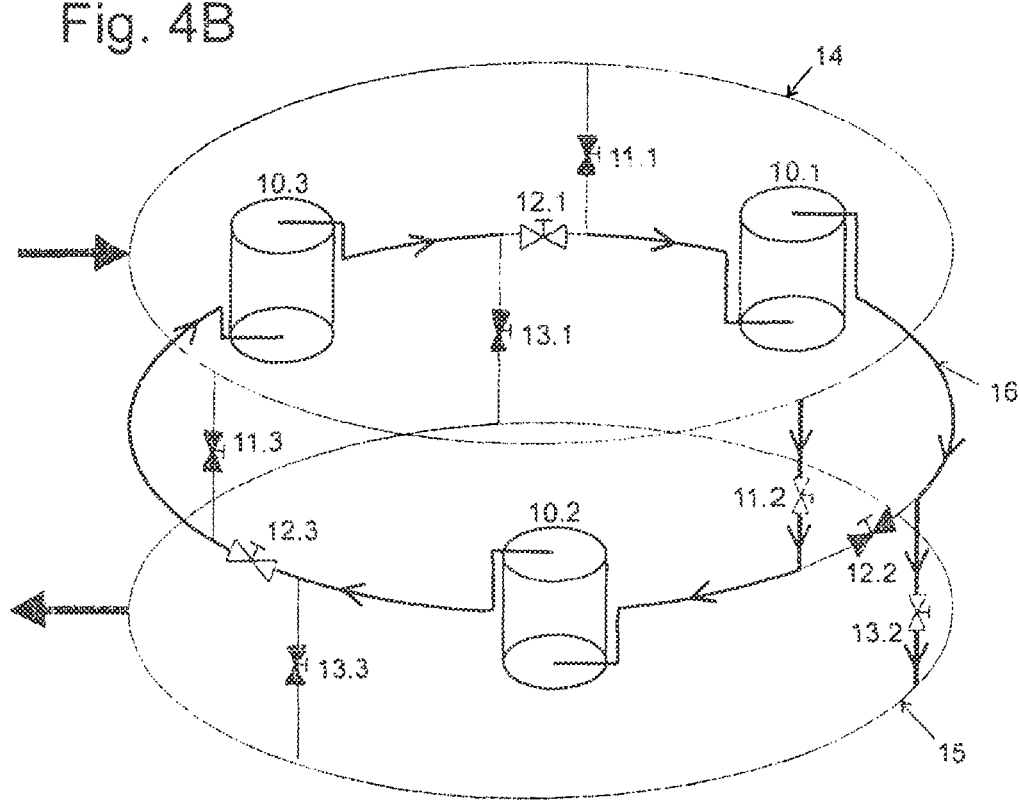
Figure 4C:
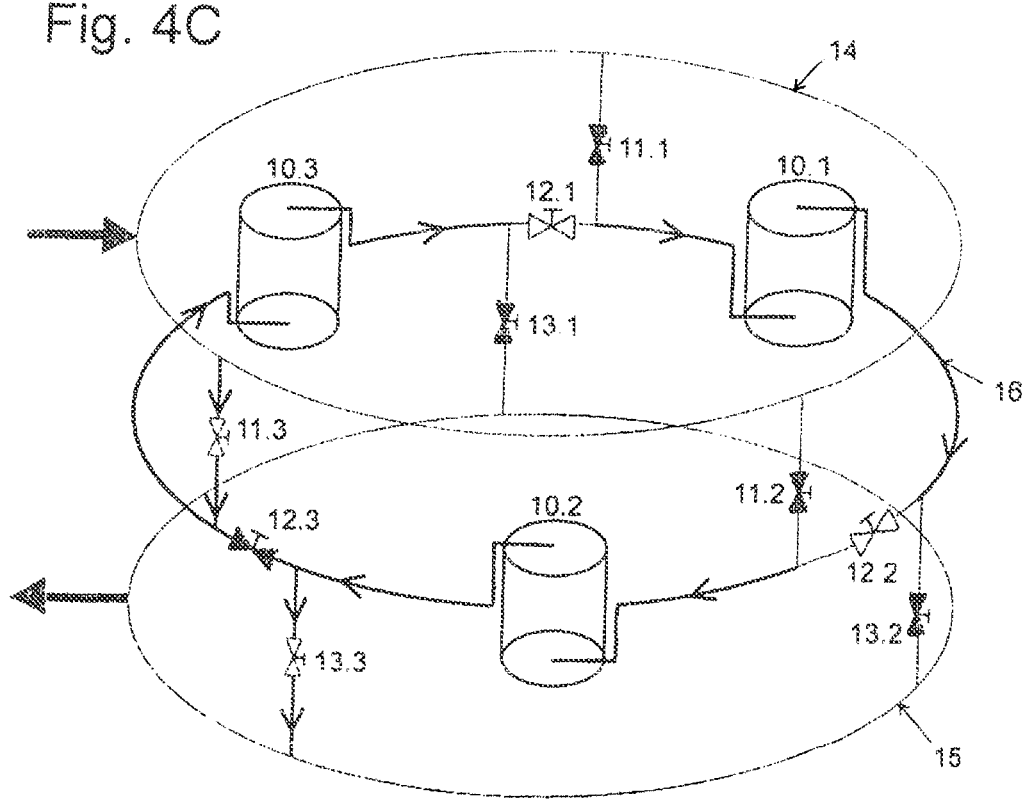
Figure 5:
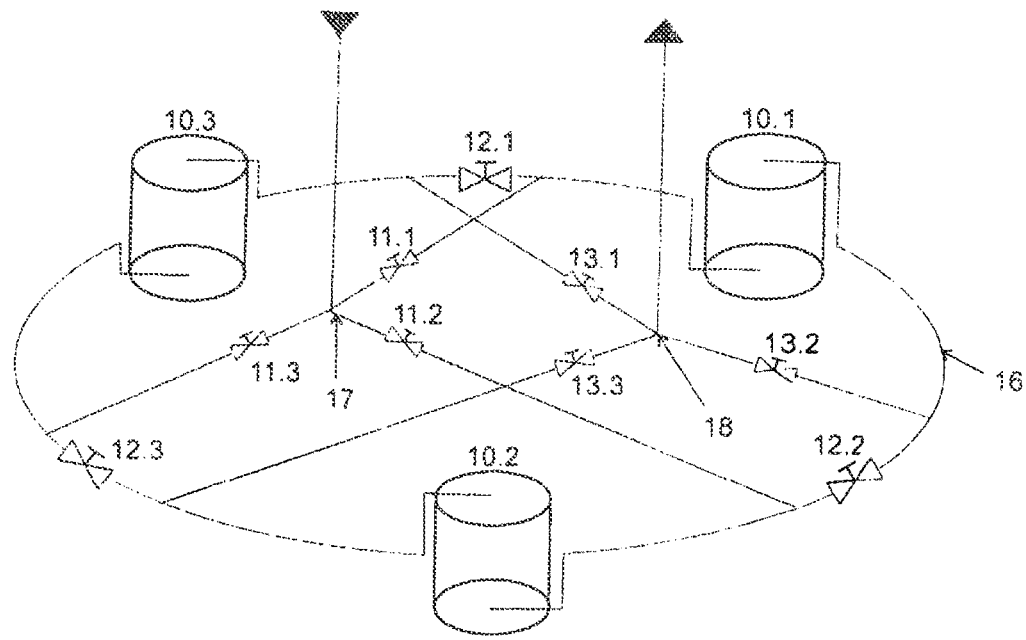

The arrangement and the method according to the invention are explained hereafter using the attached drawings. Depicted are:

FIG. 1: a schematic illustration of an ORC process according to prior art with direct use of the heat source medium in the heat exchanger of the working fluid cycle;

FIG. 2: a schematic illustration of the "Misselhorn" process with an arrangement of the heat exchangers according to DE 102013009351;

FIG. 3: a schematic illustration of the "Misselhorn" process with heat exchanger arrangement according to the invention according to a first embodiment;

FIGS. 4A-C: as schematic illustration of the switching state within a cycle for the arrangement of the heat exchangers pursuant to FIG. 3; and FIG. 5: a schematic illustration of a heat exchanger arrangement according to the invention pursuant to the second embodiment;

FIG. 6: T-Q diagram for a typical ORC process in two different operating modes; and FIG. 7: a T-Q diagram for a 10-heat exchanger arrangement according to the invention.

FIGS. 1 and 2 were already explained in the introduction. FIG. 3 depicts a schematic illustration of the "Misselhorn" process corresponding to FIG. 2 with a heat exchanger arrangement according to the invention pursuant to a first embodiment. The functioning of this heat exchanger arrangement is explained by means of the sequence of FIGS. 4A to 4c. Even though for explanation purposes the depicted embodiment assumes three heat exchangers or heat transfer devices operating as evaporators, the number of heat exchangers is n≥2.

When increasing the number of heat exchangers operating as evaporators and that having the heat source medium passing through them sequentially, the curve shape of the working fluid and the heat source medium continue to approach each other in the arrangement's T-Q diagram. Furthermore, one shall note that the working fluid lines and working fluid chambers of the heat exchangers are not depicted in FIGS. 4A to 4C to enhance clarity.

Each heat exchanger 10.1, 10.2, 10.3 of the arrangement has a heat source medium through-passage with an inlet and outlet (not depicted) and a working fluid chamber separated therefrom, also having an inlet and outlet (not depicted), so that the material flows of the heat source medium and working fluid are separated. Between the heat source medium through-passage and the working fluid chamber, one shall ensure that the heat exchange is as efficient as possible, wherein the specific construction of the heat exchangers is not significant for the functioning of the invention, but only represents an optimization task. For example, the heat exchangers may be designed as pipe bundle-heat exchangers.

The heat source medium through-passages of the heat exchangers are or can be interconnected in series, preferably in a ring arrangement or ring line 16, by the outlet of the heat source medium through-passage of a heat exchanger being connected to the inlet of the heat source medium through-passage of a subsequent heat exchanger in the ring arrangement, wherein between the heat source medium through-passages of any two serially consecutive heat exchangers 10.1, 10.2, 10.3 in the ring arrangement, there is provided in each case one valve 12.1, 12.2, 12.3, with which the connection can be selectively disconnected. Valves 12.1, 12.2, 12.3 are designed as switchable and preferably remote-actuated valves. They may be designed as controlled or simple check valves, if one ensures based on the pressure level of the heat source medium that a backflow into the heat source medium through-passage of a heat exchanger within the ring arrangement does not occur upstream of the heat source medium introduction location.

A supply line 14 for the heat source medium can be selectively connected to the inlet of the heat source medium through-passage of each heat exchanger and a discharge line 15 for the heat source medium can also be selectively connected to the outlet of the heat source medium through-passage of each heat exchanger. To do so, there are also provided, in the connecting lines between the supply line and the section of the ring line between the respective ring line valve 12.1, 12.2, 12.3 and its respective heat exchanger located downstream, switchable and preferably remote-actuated valves 11.1, 11.2, 11.3 to create and disconnect the selective connections of the supply line to the heat source medium through-passages. Accordingly, switchable and preferably remote-actuated valves 13.1, 13.2, 13.3 are provided in the connection lines between discharge line 15 and the section of the ring line between the respective ring line valve 12.1, 12.2, 12.3 and its respective heat exchanger located upstream in order to create and to disconnect the selection connections of the discharge line to the heat source medium through-passages.

The combination of connection lines and valves as well as the switchability of the valves of the arrangement is designed in such a manner that within a cycle still to be described below the inlet of the heat source medium through-passage of the heat exchanger, which has the highest pressure and/or temperature level of the working fluid among the heat exchangers of the ring arrangement, can be connected to the discharge line for the heat source medium, and that the outlet of the heat source medium through-passage of the heat exchanger, which has the lowest pressure and/or temperature level of the work medium among the heat exchangers of the ring arrangement, can be connected to the supply line for the heat source medium. When there are more than two heat exchangers in the arrangement, for the heat exchanger(s) that do not have the highest or the lowest pressure or temperature level of the working fluid, the heat source medium through-passage can only be connected to the heat source medium through-passage of the, or one of the other, heat exchanger(s), so that the heat source medium is directed in series through the heat exchanger.

Preferably, the supply and discharge lines for the heat source medium can be sequentially and synchronously connected to the heat source medium through-passages of the heat exchanger of the arrangement, so that the described further switching of the heat exchangers can occur within any given cycle in a simultaneous and clearly delineated manner. Furthermore, the arrangement is designed in such a manner that the duration of the connection of the supply and discharge lines for the heat source medium to the heat source medium through-passage of a respective heat exchanger is preset to a duration corresponding to the configuration of the arrangement and at least for a certain operating period over several cycles. Preferably, it is also possible however that the duration is controlled depending on the pressure and/or temperature of the working fluid in the heat exchanger, which among the heat exchangers in the arrangement has the highest pressure or temperature level of the working fluid, because this heat exchanger provides the evaporated working fluid for the work engine. With this control unit, one can ensure a quasi-continual supply of vaporous working fluid to the work engine at a pressure as constant as possible and one can thereby ensure operation without large outlet or engine speed fluctuations.

The connection lines and switchable valves for the working fluid as well as the working fluid chambers are not depicted in FIGS. 4 and 5, but are indicated in FIG. 3. In terms of the working fluid cycle, the multiple heat exchanger arrangement according to the invention can be integrated in the working fluid cycle of the "Misselhorn" cycle process known from DE 102013009351 for example and modifies the heat exchanger or heat releaser arrangement (see FIG. 3). The disclosure of DE 102013009351 is thus included here in regard to the working fluid cycle by making reference to the disclosure as a whole. The arrangement according to the invention also namely controls by means of a corresponding valve arrangement the connection/separation of the heat exchanger or heat transfer units to/from the cycle process in such a manner that the heat exchanger units run through the individual phases of feeding in the working fluid, heating the working fluid, and discharging the vaporous working fluid out of the heat exchanger into the work engine in a sequential and time-offset manner in each case.

The arrangement is thereby to be designed in such a manner that the introduction of the working fluid takes place into the working fluid chamber of the heat exchanger, which among the heat exchangers of the arrangement has the lowest pressure and/or temperature level of the working fluid, and the discharge of the working fluid occurs out of the working fluid chamber of the heat exchanger, which among the heat exchangers of the arrangement has the highest pressure and/or temperature level of the working fluid, and wherein the timespan of the introduction phase and the timespan of the discharge phase are essentially the same length, and the switchover of the introduction and discharge phases occurs between the heat exchangers of the arrangement in a synchronous and sequential manner. If the arrangement preferably has at least three heat exchangers, it is also designed in such a manner that the heat exchanger(s), which does/do not have the highest or the lowest pressure or temperature level of the working fluid, the working fluid remains enclosed in the working fluid chamber during the introduction and discharge phases of the other heat exchanger. For n evaporators or heat exchangers, there will basically be n different circuit situations of the valves when operating the arrangement according to these phases.

Hereinafter, a switch cycle of the arrangement of the heat exchangers will be described for example purposes using an arrangement with 3 heat exchangers and in reference to FIGS. 4A-4C. The typical three switch situations required to do so are depicted in FIGS. 4A to 4C.

In switch situation 1 (FIG. 4A), the evaporated working fluid is conducted at high pressure from heat exchanger 10.1 (corresponding for example to phase 3 of the heat exchanger operating mode using the system known from DE 102013009351) into the work engine and heat exchanger 10.3 is just being filled with a liquid working fluid by a pump. To supply heat exchanger 10.1 with the hottest heat source medium flow and heat exchanger 10.3 the heat source medium flow partially already cooled due to passing through other heat exchangers, valves 11.1, 12.2, 12.3 as well as 13.1 are opened. The remaining valves are closed. Through open valve 11.1, the heat source medium flow upstream from heat exchanger 10.1 is fed into "ring line" 16 and cools upon passing through the three heat exchangers (opened valves 12.2 and 12.3). Lastly, the cooled heat source medium is removed through open valve 13.1 (since valve 12.1 is closed) from the "ring line" and fed into the heat source medium return.

In switch situation 2 (FIG. 4B), heat exchanger 10.2 is to be fed with the hot heat source medium flow and heat exchanger 10.1 is to be fed with the cooled heat source medium flow. To do so, valves 11.2 and 13.2 as well as 12.3 and 12.1 are opened. The remaining valves are in turn closed.

In switch situation 3 (FIG. 4C), the hot heat source medium flow is to be conducted through heat exchanger 10.3 and the cooled heat source medium flow is to be conducted through heat exchanger 10.2. To do so, valves 11.3 and 13.3 as well as 12.1 and 12.2 are opened. The remaining valves are in turn closed. The cycle then ends and it re-starts with switch situation 1.

FIG. 5 depicts a second embodiment of the arrangement, in which the supply and discharge of the hot and the cooled heat source medium flow are each executed as a star-connected circuit 17 and 18 respectively.

In a (not depicted) preferred embodiment of the arrangement with multiple heat exchangers according to the invention, the heat exchangers of the arrangement are arranged or designed in such a manner that the inlet of the heat source medium through-passage of each heat exchanger is located at a lower position level than the outlet of the respective heat exchanger. In this preferred embodiment, the heat source medium flows through the heat source medium through-passages of the heat exchanger in a vertical manner from bottom to top and thus against the influence of gravity. Even if the heat source medium through-passage in the heat exchanger has a zig-zag shape for example, it is ensured that the heat source medium is conducted through the heat source medium through-passages of the heat exchanger in such a manner that it flows through the heat source medium through-passages at least partially against the influence of gravity.

The schematic illustrations of embodiments of the invention serve only to explain the invention. For that reason, the distances of the connection lines between the individual components and the arrangement, [as well as] the number and design of valves are only for example purposes and serve to explain the operating principle. Furthermore, it shall be pointed out in particular that the schematically depicted arrangements of heat exchangers or heat transfer devices each have three heat exchanging units, wherein according to the invention one heat exchanger arrangement with at least two heat exchanger units independent of each other may be sufficient and more than the three heat exchanger units may also be used.

In addition, the invention is not limited to a certain construction of the heat exchangers, wherein in particular the illustration of the heat exchangers in FIGS. 4A-C and 5 is only schematic and is only to clarify the circuit of the heat source medium through-passage within the arrangement and is not to specify any certain construction of the heat exchanger.

As work media for the arrangement according to the invention, all media usable in conventional cycles, such as the ORC cycles and the "Misselhorn" process, are considered, in particular organic or synthetic materials, for example R245fa, ethanol or R134a.

The term "heat source medium" also comprises both the medium supplied directly by a heat source and usable directly in the heat exchangers, such as hot wastewater, cooling water, etc., and also a heat transport medium such as thermal oil and similar, which circulates in a closed intermediate circuit and serves to transport the heat from a distant heat source or a heat source not suited for direct use to the heat exchangers of the cycle.

As a heat source for the arrangement according to the invention, ultimately one can consider all heat sources in the form of useful heat or waste heat from the sources described in the introduction, which supply a sufficiently high temperature level of at least 600 Celsius, preferably 60-100° Celsius and a sufficiently large volume or mass flow. However, the arrangement according to the invention can also be used with heat sources having higher temperature levels.

Even though FIGS. 3-5 depict an embodiment with single valves [sic], all valves or groups of valves may be designed as rotary valves for example with correspondingly multiple inlets and outlets. The term "valve means" chosen in the claims is therefore to comprise various designs of a means for opening/closing a fluid connection.

The invention claimed is:

1. A method for evaporating a working fluid by transferring heat of a heat source medium in an arrangement with multiple heat exchangers (10.1, 10.2, 10.3), wherein each of the multiple heat exchangers has a heat source medium through-passage with an inlet and an outlet, and a working fluid chamber separate from the heat source medium through-passage, and the respective heat source medium through-passages of the multiple heat exchangers are interconnectable, for fluid communication, in at least one of a series and a ring arrangement, the method having the steps of:
   initiating a first mode of a fluid flow cycle by connecting, for fluid communication, a supply line (14) for the heat source medium to a first inlet of the heat source medium through-passage of a first heat exchanger (10.1, 10.2, 10.3) and connecting, for fluid communication, a discharge line (15) for the heat source medium to a second outlet of the heat source medium through-passage of a second heat exchanger (10.1, 10.2, 10.3), wherein in the first mode the supply line (14) and discharge line (15) are disconnected, from fluid communication, from a second inlet of the heat source medium through-passage of the second heat exchanger and a first outlet of the heat source medium through-passage of the first heat exchanger (10.1, 10.2, 10.3), respectively;
   initiating a second mode of the fluid flow cycle by connecting, for fluid communication, the supply line to the second inlet and connecting, for fluid communication, the discharge line to the first outlet; wherein in the second mode the supply line (14) and discharge line (15) are disconnected, from fluid communication, from the first inlet and from the second outlet, respectively, wherein the first and second modes of the fluid flow cycle are sequentially repeated.

2. The method for evaporating a working fluid according to claim 1, wherein the supply and discharge lines (14, 15) are synchronously connected to the first inlet and the second outlet and disconnected from the second inlet and the first outlet in the first mode, and are synchronously connected to the second inlet and the first outlet and disconnected from the first inlet and the second outlet in the second mode.

3. The method for evaporating a working fluid according to claim 1, comprising the steps of:
   connecting, for fluid communication, the first outlet to the second inlet, in the first mode; and
   connecting, for fluid communication, the second outlet to the first inlet, in the second mode.

4. A method for evaporating a working fluid by transferring heat of a heat source medium in an arrangement with multiple heat exchangers (10.1, 10.2, 10.3), wherein each of the multiple heat exchangers has a heat source medium through-passage with an inlet and an outlet, and a working fluid chamber separate from the heat source medium through-passage, and the respective heat source medium through-passages of the multiple heat exchangers are interconnectable, for fluid communication, in at least one of a series and a ring arrangement, the method having the steps of:
   initiating a first mode of a fluid flow cycle by connecting, for fluid communication, a supply line (14) for the heat source medium to a first inlet of the heat source medium through-passage of a first heat exchanger (10.1, 10.2, 10.3) and connecting, for fluid communication, a discharge line (15) for the heat source medium to a third outlet of the heat source medium through-passage of a third heat exchanger (10.1, 10.2, 10.3), wherein in the first mode the supply line (14) is disconnected, from fluid communication, from a second inlet of the heat source medium through-passage of the second heat exchanger and a third inlet of the third heat exchanger, and discharge line (15) is disconnected, from fluid communication, from a first outlet of the heat source medium through-passage of the first heat exchanger, and second outlet of the heat source medium through-passage of the second heat exchanger (10.1, 10.2, 10.3);

initiating a second mode of the fluid flow cycle by connecting, for fluid communication, the supply line to the second inlet and connecting, for fluid communication, the discharge line to the first outlet and wherein in the second mode the supply line (14) is disconnected, from fluid communication, from the first inlet and the third inlet and the discharge line (15) is disconnected from the second outlet and the third outlet; and initiating a third mode of the fluid flow cycle by connecting, for fluid communication, the supply line to the third inlet and connecting, for fluid communication, the discharge line to the second outlet and wherein in the third mode the supply line (14) is disconnected, from fluid communication, from the first inlet and the second inlet and the discharge line (15) is disconnected from the first outlet and the third outlet, wherein the first, second, and third modes of the fluid flow cycle are sequentially repeated.

5. The method for evaporating a working fluid according to claim 4, comprising the steps of:

connecting, for fluid communication, the first outlet to the second inlet and the second outlet to the third inlet, in the first mode;

connecting, for fluid communication, the second outlet to the third inlet and the third outlet to the first inlet, in the second mode; and connecting, for fluid communication, the third outlet to the first inlet and the first outlet to the second inlet, in the third mode.

6. The method for evaporating a working fluid according to claim 4, wherein in the first mode the third heat exchanger has at least one of a highest pressure and temperature level of the working fluid among the multiple heat exchangers (10.1, 10.2, 10.3) and the first mode the first heat exchanger has at least one of a lowest pressure and temperature level among the heat exchangers (10.1, 10.2, 10.3), wherein in the second mode the first heat exchanger has at least one of a highest pressure and temperature level of the working fluid among the multiple heat exchangers (10.1, 10.2, 10.3), in the second mode the second heat exchanger has at least one of a lowest pressure and temperature level among the heat exchangers, and wherein in the third mode the third heat exchanger has at least one of a lowest pressure and temperature level among the heat exchangers and in the third mode the second heat exchanger has at least one of a highest pressure and temperature level of the working fluid among the multiple heat exchangers (10.1, 10.2, 10.3).

7. The method for evaporating a working fluid according to claim 6, wherein a duration of the fluid connection of the supply and discharge lines (14, 15) for the respective first, second, and third modes are at least one of:

preset with at least one of the first, second and third heat exchangers (10.1, 10.2, 10.3); and controlled depending on:

at least one of a pressure and temperature of the working fluid in the third heat exchanger in the first mode;

depending on at least one of a pressure and temperature of the working fluid in the first heat exchanger in the second mode; and depending on at least one of a pressure and temperature of the working fluid in the second heat exchanger in the third mode.

8. The method for evaporating a working fluid according to claim 6, wherein in an introduction phase of the first mode, a feeding-in of the working fluid occurs into the working fluid chamber of the first heat exchanger, and in a discharge phase of the first mode, the discharge of the working fluid occurs out of the working fluid chamber of the third heat exchanger, and that a timespan of the introduction phase and a timespan of the discharge phase comprise about the same length, and the further switching of the introduction and discharge phases to initiate the second mode, the second mode occurs synchronously with regard to connecting and disconnecting the supply and discharge lines, respectively, and the initiation and terminations of the first, second, and third modes occur sequentially among the first, second, and third heat exchangers.

9. The method for evaporating a working fluid according to claim 8, wherein in the first mode the second heat exchanger lacks a highest or lowest pressure or temperature level of the working fluid of the arrangement with the multiple heat exchangers wherein the working fluid remains enclosed in the working fluid chamber of the second heat exchanger during the introduction and discharge phases of the first and third heat exchangers (10.1, 10.2, 10.3), wherein in the second mode the third heat exchanger lacks a highest or lowest pressure or temperature level of the working fluid of the arrangement with the multiple heat exchangers, and wherein the working fluid remains enclosed in the working fluid chamber of the third heat exchanger during the introduction and discharge phases of the first and second heat exchangers (10.1, 10.2, 10.3), and wherein in the third mode the first heat exchanger lacks a highest or lowest pressure or temperature level of the working fluid of the arrangement with the multiple heat exchangers wherein the working fluid remains enclosed in the working fluid chamber of the first heat exchanger during the introduction and discharge phases of the second and third heat exchangers (10.1, 10.2, 10.3).

10. The method for evaporating a working fluid according to claim 9, wherein in the first mode the heat source medium through-passage of the second heat exchanger (10.1, 10.2, 10.3), is connected for fluid communication only to the heat source medium through-passage of the first or third heat exchangers in the second mode the third heat exchanger is connected for fluid communication only to the heat source medium through-passage of the first or second heat exchangers and, in the third mode the first heat exchanger is connected for fluid communication only to the heat source medium through-passage of the second or third heat exchangers.

11. A method for evaporating a working fluid by transferring heat of a heat source medium in an arrangement with multiple heat exchangers, each of the multiple heat exchangers having a heat source medium through-passage with an inlet and an outlet, and a working fluid chamber separate from the heat source medium through-passage, and wherein the heat source medium through-passages are selectively couplable in series for fluid communication, the method comprising the steps of:

in a first mode selectively connecting, for fluid communication, a supply line for the heat source medium to a first inlet of the heat source medium through-passage of a first heat exchanger and further in the first mode selectively connecting, for fluid communication, a discharge line for the heat source medium to a second outlet of the heat source medium through-passage of a second heat exchanger, in the first mode the supply line is separated from fluid communication from a first outlet of the heat source medium through-passage of the first heat exchanger and the discharge line is separated from fluid communication from a second inlet of the heat source medium through-passage of the second heat exchanger, and, in a second mode, responsive to the presence of a third heat exchanger of the multiple heat exchangers being in selective fluid communication with the first and second heat exchangers, the discharge line and the supply line are separated from fluid communication from a third inlet and a third outlet of the heat source medium through-passages of the third heat exchanger.

12. The method for evaporating a working fluid according to claim 11, comprising:
in the first mode:
feeding-in the working fluid into the working fluid chamber of the first heat exchanger, the first heat exchanger comprising a low heat exchanger during an introduction phase, the first heat exchanger comprising at least one of a lowest pressure and temperature level of the working fluid relative to pressure and temperature levels of any heat exchanger of the arrangement with the multiple heat exchangers; and
discharging the working fluid out of the working fluid chamber of the second heat exchanger, the second heat exchanger comprising a high heat exchanger during a discharge phase, the second heat exchanger comprising at least one of a highest pressure and temperature level of the working fluid relative to pressure and temperature levels of any other heat exchanger of the arrangement with the multiple heat exchangers;
in the second mode:
feeding-in the working fluid into the working fluid chamber of the second heat exchanger, the second heat exchanger comprising a low heat exchanger during an introduction phase, the second heat exchanger comprising at least one of a lowest pressure and temperature level of the working fluid relative to pressure and temperature levels of any heat exchanger of the arrangement with the multiple heat exchangers; and
discharging the working fluid out of the working fluid chamber of the first heat exchanger, the first heat exchanger comprising the high heat exchanger during a discharge phase, the first heat exchanger comprising at least one of a highest pressure and temperature level of the working fluid relative to pressure and temperature levels of any other heat exchanger of the arrangement with the multiple heat exchangers.

13. The method for evaporating a working fluid according to claim 12, comprising assigning a first timespan to the introduction phase and a second timespan to the discharge phase, wherein the first and second timespans are the same length.

14. The method for evaporating a working fluid according to claim 12, comprising selectively connecting the supply line and the discharge line synchronously and sequentially initiating the first and second modes.

15. The method for evaporating a working fluid according to claim 11, comprising pre-setting a duration of the selectively connecting, for fluid communication, of the supply and discharge lines with a respective heat exchanger.

16. The method for evaporating a working fluid according to claim 11, comprising altering a duration of the selectively connecting, for fluid communication, of the supply and discharge lines responsive to at least one of a pressure and a temperature of the working fluid in a respective heat exchanger.

17. The method for evaporating a working fluid according to claim 11, wherein each heat exchanger of the arrangement comprises an inlet of the heat source medium through-passage of the respective heat exchanger that is located at a lower position level vertically than the outlet of the heat source medium through-passage of the respective heat exchanger.

18. The method for evaporating a working fluid according to claim 11, comprising utilizing a switchable valve means to create or break the selective fluid connections of the supply and discharge lines to the heat source medium through-passages of all the heat exchangers in the arrangement of the multiple heat exchangers.

19. The method for evaporating a working fluid according to claim 12, comprising retaining the working fluid in the working fluid chamber of the third heat exchanger of the arrangement wherein the third heat exchanger is not the high or the low heat exchanger during the introduction and discharge phases of the high and low heat exchangers, wherein the arrangement comprises at least three heat exchangers.

20. A method for evaporating a working fluid by the transferring heat of a heat source medium in an arrangement with multiple heat exchangers, wherein each of the multiple heat exchangers comprise a heat source medium through-passage with an inlet and an outlet, and a working fluid chamber separate from the heat source medium through passage, and wherein, the heat source medium through-passages are selectively couplable for fluid communication in series, the method comprising the steps of:
in a first mode selectively connecting, for fluid communication, a supply line for the heat source medium to a first inlet of the heat source medium through-passage of a first heat exchanger further in the first mode selectively connecting, for fluid communication, a discharge line for the heat source medium to a second outlet of the heat source medium through-passage of a second heat exchanger, the supply line and discharge line are separated from fluid communication from a second inlet of the heat source medium through-passage of the second heat exchanger and a first outlet of the heat source medium through-passage of the first heat exchanger and, responsive to a third heat exchanger of the multiple heat exchangers being in selective fluid communication with the first and second heat exchangers, the discharger line and the supply line are separated from fluid communication from a third inlet and outlet of the heat source medium through-passages of the third heat exchanger;
feeding-in the working fluid into the working fluid chamber of the first heat exchanger which comprises a low heat exchanger during an introduction phase, wherein the low heat exchanger has at least one of a lowest pressure and temperature level of the working fluid relative to pressure and temperature levels of all other heat exchangers comprised in the multiple heat exchangers;
discharging the working fluid out of the working fluid chamber of the second heat exchanger which comprises a high heat exchanger during a discharge phase, wherein the high heat exchanger has at least one of a highest pressure and temperature level of the working fluid relative to pressure and temperature levels of all other heat exchangers comprised in the multiple heat exchangers; and retaining the working fluid in the working fluid chamber of the third heat exchanger, the third heat exchanger comprises neither the high or the low heat exchanger during the introduction and discharge phases of the first and second heat exchangers.

\* \* \* \* \*